United States Patent

[11] 3,604,521

| [72] | Inventor | Johnnie C. Collins<br>Dallas, Tex. |
|---|---|---|
| [21] | Appl. No. | 24,668 |
| [22] | Filed | Mar. 27, 1970 |
| [45] | Patented | Sept. 14, 1971 |
| [73] | Assignee | Servis Equipment Company<br>Dallas, Tex. |

[54] EARTH BORING APPARATUS
9 Claims, 6 Drawing Figs.

[52] U.S. Cl. .................................................. 173/38
[51] Int. Cl. .................................................. E21c 1/14,
                                                       E21c 11/02
[50] Field of Search .......................................... 173/38

[56] References Cited
UNITED STATES PATENTS

| 2,320,775 | 6/1943 | Garner .......................... | 173/38 |
| 2,557,637 | 6/1951 | Danuser ........................ | 173/38 |

*Primary Examiner*—Ernest R. Purser
*Attorney*—Schley & Schley

ABSTRACT: An earth boring apparatus for attachment to a tractor rear lift mechanism and power take off (P.T.O.) and having a telescoping boom for pivotally supporting an auger in vertical position throughout the arcuate swinging of the boom about a horizontal arc in coaction with a lifting bail and a stabilizer control link, the driven gear of the auger being connected to P.T.O. by a telescoping drive shaft.

INVENTOR.
Johnnie C. Collins
BY *Shley & Shley*
ATTORNEYS

3,604,521

EARTH BORING APPARATUS

SUMMARY OF THE INVENTION

An earth boring apparatus or post hole digger of improved simplified construction for drilling a straight vertical hole and adapted to be attached to a three-point tractor rear lift mechanism. The apparatus includes a telescoping boom pivotally connected to the upper yoke of the lift mechanism and to the gear box of an auger, an upright lifting bail underlying the boom and pivotally connected to the slidable member thereof as well as to the lower lift arms of said mechanism, a stabilizer control link pivotally connected to the bail and to the nonslidable member of said boom and a telescoping drive shaft pivotally and drivingly connected to the power tack off (P.T.O.) of a tractor and to the driving gear of the auger. Upon raising and lowering of the lifting bail, the stabilizer link moves an arc about the movable, horizontal axis of its pivotal connection to the boom so as to force the telescoping member of the latter to slide outwardly and inwardly and thereby permit the auger to remain in a vertical plane. A pivoted connector or link, interposed between the boom and auger gear box, swings in an arc about the horizontal axes of its fastenings to the gear box and boom when said boom reaches a horizontal plane whereby the auger is free to undergo swinging movement so as to retain its vertical disposition. Also, the telescoping boom with the other coacting elements of the apparatus permits greater elevation and length of the auger.

A construction designed to carry out the invention will be described hereinafter together with other features thereof.

DESCRIPTION OF THE PREFERRED EMBODIMENT

Figure 1:
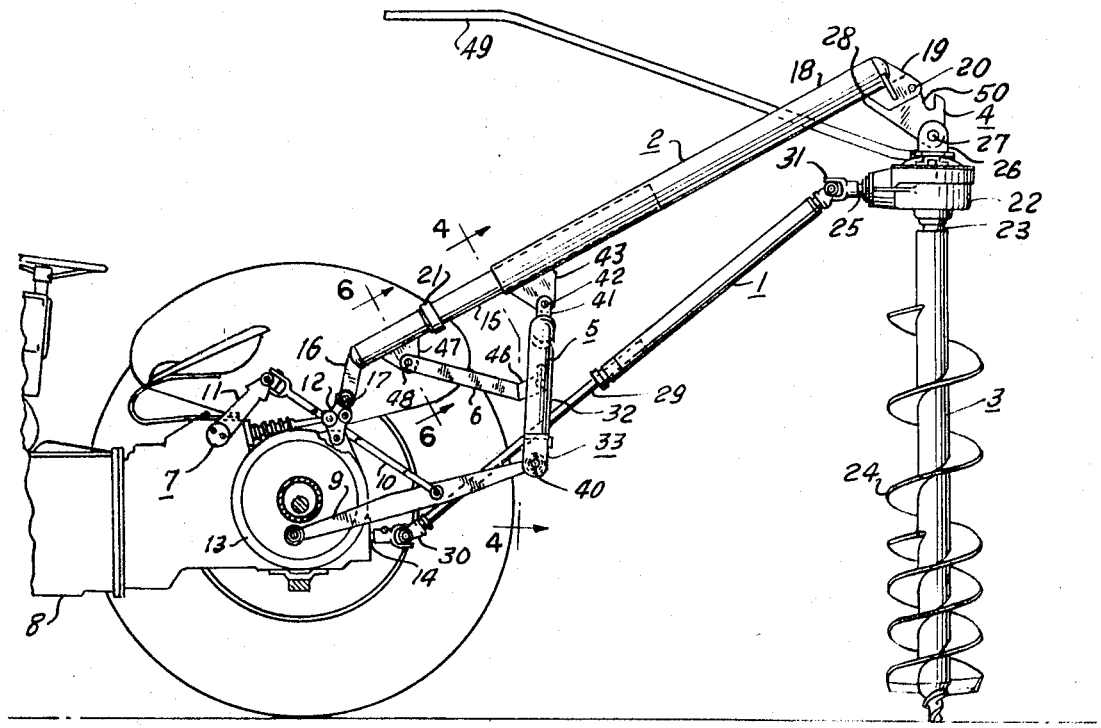
FIG. 1 is a side elevational view, partly in section, of an earth boring apparatus constructed in accordance with the invention and attached to the rear lift mechanism and power take off (P.T.O.) of a tractor, a portion of which is shown, the apparatus being elevated position preparatory to drilling a hole.

In the drawings, the numeral 1 designates an earth boring apparatus or post hole digger embodying the principles of the invention and having a longitudinal telescoping boom 2, an upright auger 3, a pivoted connector or link 4 between the boom and auger, a transverse lifting bail 5 underlying and pivotally connected to the slidable portion of said boom and a pair of longitudinal, angular stabilizer control arms or links 6 pivotally connected to the nonslidable portion of said boom and pivotally and slidably connected to the lifting bail. The apparatus is adapted to be attached to the real lift mechanism 7 of a tractor 8; said mechanism includes a pair of conventional swingable arms 9 pivotally connected by a pair of elongate links 10 to the power levers 11 of said mechanism and an upper link point, such as a rocket arm or yoke 12 which may be pivotally mounted at the upper portion of the axle housing 13 of the tractor, said tractor having the usual power take off (P.T.O.) shaft 14 projecting rearwardly from said axle housing.

Figure 2:
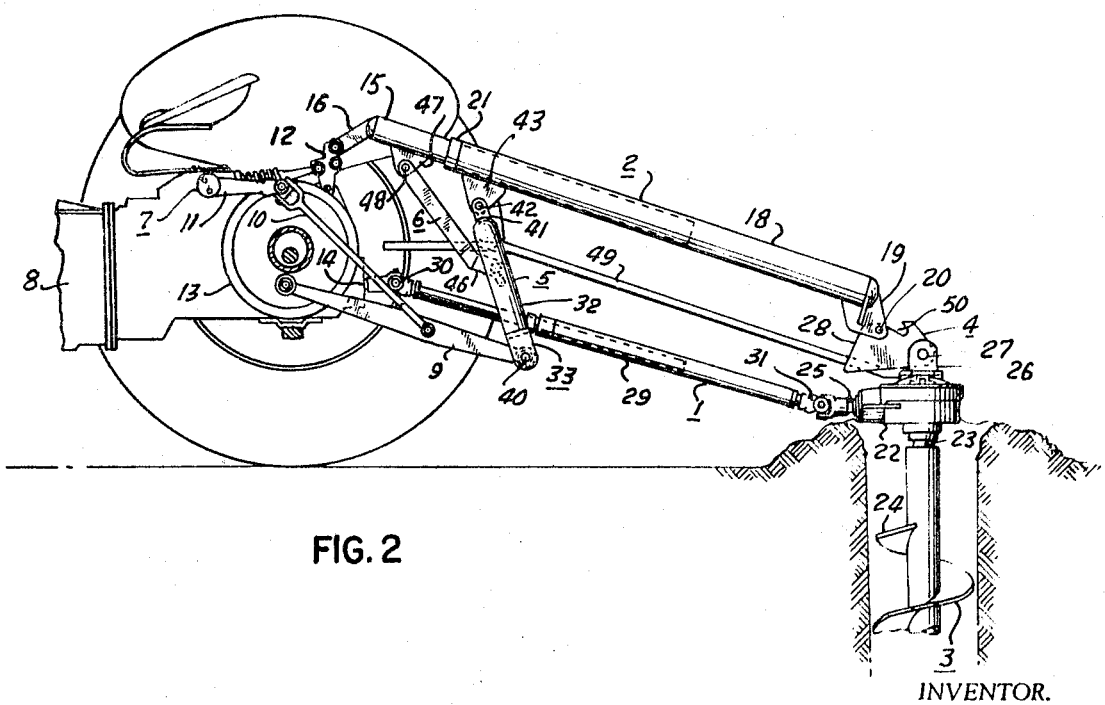
FIG. 2 is a view, similar to FIG. 1, showing the apparatus in its lowermost position with its auger within a drilled hole.
Figure 3:
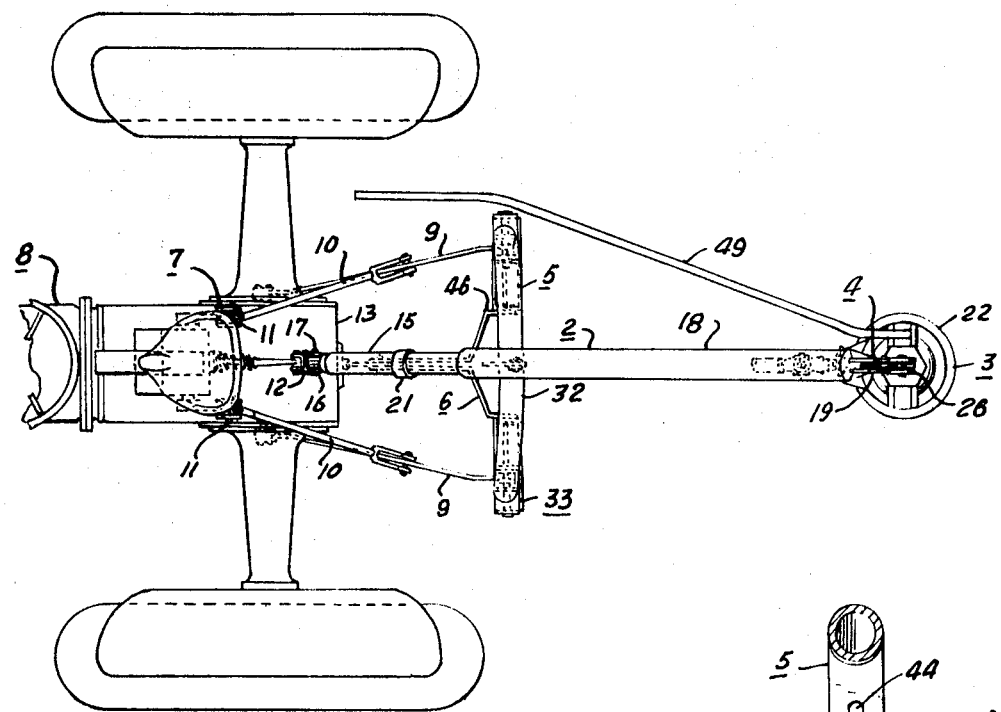
FIG. 3 is a top plan view of the apparatus and lift mechanism and the rear portion of the tractor.

The telescoping boom 2 includes an elongate, cylindrical inner or male member 15 having a yoke 16 extending downwardly at an obtuse angle from its front end and pivotally fastened to the rocker arm 12 of the tractor lift mechanism as shown at 17 in FIGS. 1–3. A complementary, tubular outer or female member or sleeve 18 is slidably mounted on the rear portion of the inner member 15, and a yoke 19 projects downwardly at an obtuse angle from the rear end of the sleeve for pivotal connection, as shown at 20, with the upper portion of the pivoted link 4. For limiting inward or forward telescoping or retraction of the sleeve 18 and shortening of the boom, the inner member has a collar 21 secured on its front end portion.

The auger 3 is of more or less conventional construction and comprises a right-angle gear box or head 22, a drive or output shaft 23 depending from the gear box, a helical or screw-type blade 24 mounted on the output shaft for rotation therewith with a driven or input stub shaft 25 projecting radially forward of said box. A yoke 26 upstands from the gear box 22 for pivotal connection, as shown at 27 in FIGS. 1 and 2, with the lower rear end of the pivoted link 4. The latter is in the form of an upright flat plate and has an acutely angled front end to provide a forwardly downwardly inclined margin 28 for engaging the underside of the telescopic sleeve 18 to limit swinging of the auger forwardly toward the boom 2. For importing rotation of the output shaft 23 and blade 24, telescoping longitudinal drive shaft 29 extends between and is pivotally connected to the tractor P.T.O. shaft 14 and the input shaft 25 of the auger 3 by universal joints 30 and 31.

Figure 5:
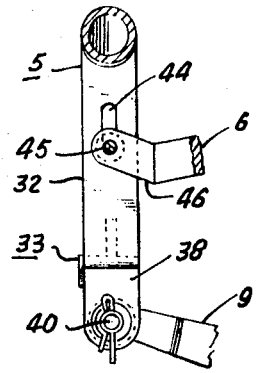
FIG. 5 is a vertical sectional view, taken on the line 5—5 of FIG. 4, showing the pin and slot connection between the stabilizer and lifting bail.
Figure 4:
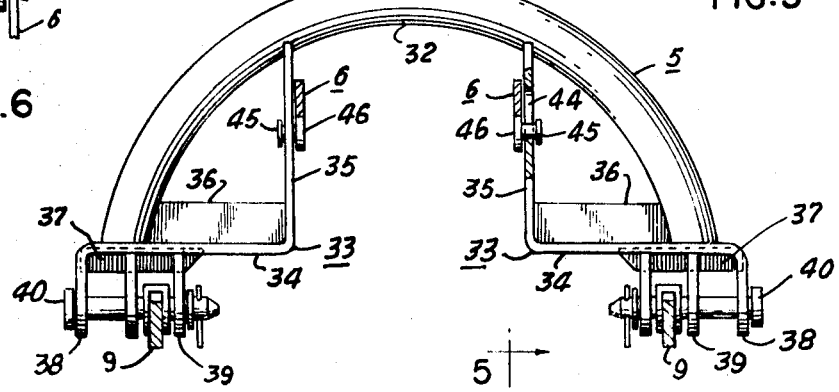
FIG. 4 is a transverse, vertical, sectional view, taken on the line 4—4 of FIG. 1, showing the lifting bail, and portions of the telescoping boom, stabilizer control links of the apparatus and the lift arms of the mechanism.

As best shown in FIGS. 4 and 5, the lifting bail 5 includes an inverted U-shaped or semiannular frame or yoke 32 having an angular bar or modified S-shaped bracket extending between its upper bight or medial portion and the lower extremity of each of its depending legs. Each angular bracket 33 has a transverse lower portion or leg 34 secured to each leg extremity of the yoke 32 and an inner upstanding leg 35 secured to the underside of the bight of said yoke in spaced relation to the other bracket. Suitable transverse flat bars or braces 36 and 37 reinforce the connection and medial portions of the brackets to the lower extremities of the yoke legs. The lower outer extremity of each bracket 33 is bent downwardly so as to provide a depending hitch lug 38 for attaching the bail 4 to the rear ends of the swingable arms 9 of the tractor lift mechanism 7. Additional hitch lugs 39 depend from each lower bracket leg 34 in spaced parallel relation to each lug 38 and all of the lugs and the lift arms are apertured for receiving transverse connecting pins 40. A pair of apertured lugs 41 (FIGS. 1, 2 and 4) upstand from the bight of the yoke 32 in spaced parallel relationship for pivotal connection by a transverse pin 42 to a similar lug 43 which depends from the underside of the slidable sleeve 18 of the boom 2.

Figure 6:
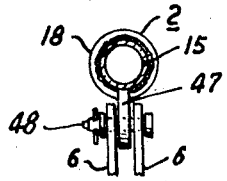
FIG. 6 is a transverse, vertical, sectional view, taken on the line 6—6 of FIG. 1, showing the pivotal connection between the boom and stabilizer links.

As shown in FIGS. 4 and 5, the upstanding leg 35 of each bracket 33 has a longitudinal slot or elongated opening 44 in its upper portion for pivotal and slidable connection by a transverse rivet or other fastener 45 to the rear extremity 46 of each of the angular stabilizer arms or links 6. Preferably, each link extremity 46 extends upwardly at an obtuse angle so as to clear the bight of the yoke 32 when the apparatus is lowered as shown in FIG. 2. An apertured lug 47 depends the upper side of the front end portion of the nonslidable member 15 of the telescoping boom for pivotal connection to the apertured contiguous front ends of the stabilizer links by a transverse pin 48 (FIGS. 1, 2, and 6) whereby swinging of the tractor lift arms 9 is transmitted by the bail 5 under the control of said links. It is desirable to secure an elongated handle 49 to the gear box 22 for accurately positioning the auger 3 at the desired location of the hole to be dug as well as for holding said auger in a vertical plane. Also, a notch 50 may be provided in the upper margin of the pivoted link 4 to permit use of said link as a hook for lifting articles by means of the boom upon removal of the auger.

In operation, the apparatus 1 is positioned as shown in FIG. 1 with the telescoping boom 2 extended and the blade 24 of the auger 3 engaged with the ground. Upon actuation of the P.T.O. shaft of the tractor 8, the auger blade tends to dig into the ground and penetration is caused by the weight of the apparatus and rotation of said blade. This movement pulls the bail 5 and boom downwardly, said bail pivoting forwardly about the axes of the pins 40 as well as downwardly about the axis of the pin 42 and the boom swinging downwardly about the axis of the pin 17 due to the simultaneous forward and downward pivoting of the stabilizer control arms or links 6 about the axes of the pins 48. Also, the outer boom member or sleeve 18 telescopes forwardly relative to the inner boom member 15 so as to shorten the effective length of the boom and prevent tilting of the auger from the vertical.

Due to the pivoted connector or link 4 and its pivotal connections 20 and 27, the bail and its pivotal connections 40 and 42 and the stabilizer control arms or links and their pin and slot connections, 45, 44 and pivotal connections 48, the auger 3 is reciprocated in a vertical plane or rectilinearly upon arcuate swinging movement of the boom 2. Downward movement of the auger is limited by engagement of the outer boom member or sleeve with the stop collar 21 of the inner boom member and in coaction, as shown in broken lines in FIG. 2, with the engagement of the pins 45 with the upper ends of the slots 44 of the bail brackets 33. Upon raising of the bail 5 by upward swinging of the tractor lift arms 9, the stabilizer links 6 pivot rearwardly and upwardly so as to pivot said bail rearwardly and upwardly and force the sleeve 18 outwardly or rearwardly as well as coact with said bail to swing the boom 2 upwardly. During this movement, the auger remains vertically aligned with the dug hole due to the double pivot of the link 4. It is noted that the structure of the apparatus permits greater elevation and length of the auger.

The foregoing description of the invention is explanatory thereof and various changes in the size, shape and materials, as well as in the details of the illustrated construction, may be made without departing from the spirit of the invention.

I claim:

1. An earth boring apparatus for attachment to the power take off of a tractor and its rear lift mechanism having a top link and a pair of lower arms including a telescoping boom having an inner member for pivotal connection with the top link of the tractor rear lift mechanism so as to extend rearwardly therefrom and an outer member slidably mounted relative to the inner member, connector means pivotally fastened to and depending from the rear end of the outer telescopic member of the boom, auger means pivotally attached to the connector means in spaced relation to the pivotal fastening of the latter to the outer telescopic member so as to depend vertically from said boom, telescoping drive means extending between and pivotally connected to the auger and tractor power take off shaft, upstanding bail means below said boom and extending transversely between the pair of lower arms of the tractor rear lift mechanism for pivotal connection to the arms, means for pivotally fastening the upper portion of the bail means to the front end portion of the outer telescopic member, stabilizer means extending longitudinally between said inner telescopic member and bail means, means pivotally attaching the front of the stabilizer means to the front end portion of said inner telescopic member, and means for pivotally and slidably connecting the rear end of said stabilizer means to the intermediate portion of said bail means, said bail and stabilizer means coacting to impart swinging movement to said boom about the horizontal axis of its pivotal connection to the top link of the tractor rear lift mechanism upon pivotal movement of the pair of lower arms of said lift mechanism as well as to retract and elongate said boom and thereby permit said auger means to undergo substantially rectilinear movement.

2. An earth boring apparatus as defined in claim 1 wherein the upstanding bail means includes a yoke having an upper bright portion and a pair of depending legs, an angular bracket having a lower leg secured to and projecting transversely inward of the lower end of each leg of the yoke and an upstanding leg secured to the bight portion of said yoke, and means for pivotally fastening the lower legs of the angular brackets to the lower arms of the tractor rear lift mechanism, the upstanding leg of each bracket having a slot extending longitudinally thereof for receiving and confining the pivotal and slidable connecting means at the rear end of the stabilizing means.

3. An earth boring apparatus as defined in claim 1 wherein the upstanding bail means includes a yoke having an upper bight portion and a pair of depending legs, means at the lower portion of each leg of the yoke for pivotal connection to the lower arms of the tractor rear lift mechanism, and upright means secured to and depending from the bight portion of said yoke and having an elongate opening extending longitudinally thereof for receiving and confining the pivotal and slidable connecting means at the rear end of the stabilizer means.

4. An earth boring apparatus as defined in claim 3 wherein the connector means includes an upright element having its front upper portion pivotally fastened to the rear end of the outer member of the telescoping boom and its rear lower portion to the upper portion of the auger means, the element having a surface for engaging the underside of said boom member to limit forward swinging movement of said auger means toward said boom.

5. An earth boring apparatus as defined in claim 4 wherein the stabilizer means includes a pair of arms having their front ends pivotally attached to the front end portion of the inner member of the telescoping boom, the rear ends of the arms having separate pivotal and slidable connection with the upright means of the bail means.

6. An earth boring apparatus as defined in claim 3 wherein the stabilizer means includes a pair of arms having their front ends pivotally attached to the front end portion of the inner member of the telescoping boom, the rear ends of the arms having separate pivotal and slidable connection with the upright means of the bail means.

7. An earth boring apparatus as defined in claim 6 wherein the connector means includes an upright element having its front upper portion pivotally fastened to the rear end of the outer member of the telescoping boom and its rear lower portion to the upper portion of the auger means, the element having a surface for engaging the underside of said boom member to limit forward swinging movement of said auger means toward said boom.

8. An earth boring apparatus as defined in claim 1 wherein the connector means includes an upright element having its front upper portion pivotally fastened to the rear end of the outer member of the telescoping boom and its rear lower portion to the upper portion of the auger means, the element having a surface for engaging the underside of said boom member to limit forward swinging movement of said auger means toward said boom.

9. An earth boring apparatus as defined in claim 1 wherein the stabilizer means includes a pair of arms having front ends pivotally attached to the front end portion of the inner member of the telescoping boom, the rear ends of the arms having separate pivotal and slidable connection with the intermediate portion of the bail means.